United States Patent
Gardner

[15] 3,706,494
[45] Dec. 19, 1972

[54] OPTICAL RATE-OF-DISPLACEMENT MEASURING APPARATUS

[72] Inventor: Peter Gardner, Camberley, England

[73] Assignee: The Secretary of State for Defense in Her Britannic Majesty's Government of the United Kingdom of Great Britain and Northern Ireland, London, England

[22] Filed: June 21, 1971

[21] Appl. No.: 155,196

[30] Foreign Application Priority Data

June 19, 1970 Great Britain.....................29,793/70

[52] U.S. Cl..................356/28, 250/237 G, 324/175, 356/256
[51] Int. Cl.........G01p 3/36, G02b 27/32, H01j 3/14
[58] Field of Search .356/256, 28; 250/237 R, 237 G; 324/175

[56] References Cited

UNITED STATES PATENTS

| | | | |
|---|---|---|---|
| 3,432,237 | 3/1969 | Flower et al............................356/28 |
| 3,519,351 | 7/1970 | Lerwill..................................250/28 |
| 3,170,068 | 2/1965 | Petriw et al.......................250/237 R |
| 3,344,700 | 10/1967 | Brake..............................250/237 G |

Primary Examiner—Ronald L. Wibert
Assistant Examiner—V. P. McGraw
Attorney—Hall, Pollock & Vande Sande

[57] ABSTRACT

According to the invention there is provided an optical masking device comprising a first pair of mask patterns and a second pair of mask patterns, each mask pattern formed of parallel alternately opaque and translucent bars, the mask patterns being mounted in parallel planes and in a fixed relationship to each other so that their bars are all parallel to each other and so that parallel light rays incident on both pairs of mask patterns such that they pass through the translucent bars of both patterns of the first pair of mask patterns with maximum transmission will be substantially obstructed by the opaque bars of one pattern of the second pair of mask patterns. Apparatus for the detection of apparent movement of an object point or scene in a given direction, and apparatus for the detection of such movement in two mutually orthogonal directions, both of which employ an optical masking device as described above, are also disclosed. Such apparatii have applications in airborne photographic equipment in which it is required to compensate for the movements of an object occurring during the period of exposure.

4 Claims, 5 Drawing Figures

OPTICAL RATE-OF-DISPLACEMENT MEASURING APPARATUS

BACKGROUND OF THE INVENTION

The present invention relates to optical masking devices and apparatus incorporating such devices for detecting relative movements between an object point or scene and the optical apparatus.

There are many requirements where accurate measurements of the movement of an image or an object scene is required. For example, in airborne photographic apparatus it is required to compensate for movements of an object occurring during the period of an exposure.

It is known that movements of a real object may be measured by placing a mask pattern formed of parallel strips which are alternatively translucent and opaque, collecting the light from the object which passes through the translucent strips on a detector and measuring the frequency of an alternating component of the detector output signal, which occurs due to movements of the image transverse to the direction of the strips. However in systems of this previously known kind the image movements are indicated by very small periodic signals generally superimposed on a much larger variable signal caused by changes in the field of view or its average brightness. Thus the known arrangements tend to have a poor signal-to-noise ratio, which tends to limit their usefulness and reliability.

SUMMARY OF THE INVENTION

According to the present invention there is provided an optical masking device including a first pair of mask patterns and a second pair of mask patterns, each mask pattern being formed of parallel alternately opaque and translucent bars, the mask patterns being mounted in parallel planes and in a fixed relationship to each other so that their bars are all parallel to each other and so that parallel light rays incident on both pairs of mask patterns at an angle such that they pass through the translucent bars of both patterns of the first pair of mask patterns with maximum transmission will be substantially obstructed by the opaque bars of one pattern of the second pair of mask patterns.

A mask pattern of the first pair may be formed on the same support as a mask pattern of the second pair. Both pairs of mask patterns may be formed on a single integral support.

In another aspect of the present invention there is provided apparatus for the detection of apparent movement of an object point or scene including an optical masking device as hereinbefore described, photo-responsive elements each of which is arranged to receive the light transmitted through a separate one of the pairs of mask patterns and differencing circuits responsive to differences between signal outputs of the photo-responsive elements. The light-receiving surfaces of the photo-responsive elements may carry one of the mask patterns of each pair, or may be formed of parallel bars of alternately light-sensitive and light-insensitive areas so as to perform the function of these patterns by an equivalent structure.

The transmitted light will cause each element to produce an electrical output signal. Any apparent movement of the object transverse to the bars of the mask patterns will tend to amplitude modulate these output signals with a modulation frequency related to the speed of transverse movement and the spacing of the bars. The modulation caused on the output signal of the element associated with the first pair of mask patterns will be in anti-phase to the modulation caused on the output signal of the element associated with the second pair of mask patterns and this property may be exploited as hereinafter described to derive an object scene movement indicating signal which will be comparatively insensitive to larger variations of the output signals caused by changes in the field of view or its average brightness.

One particular embodiment incorporating apparatus according to the invention comprises apparatus for an airborne photographic camera, for compensating apparent object movements due to the forward motion of the aircraft. Signals from the apparatus may be used to cause appropriate movements of the film while the camera shutter is open to compensate at least for the main component of the relative movement between the camera and an object being photographed. It is known that the compensating factor in this type of situation is proportional to $V/h$, where $V$ is the speed of the aircraft and $h$ is its altitude above the object being photographed.

Thus in a photographic camera in accordance with this embodiment of the invention, apparatus incorporating an optical device and a pair of light sensitive elements as hereinbefore described is arranged to produce an output signal proportional to a transverse velocity of the object point or scene relative to the camera. This signal is used as an input control signal to a velocity control servo system which moves the camera or film so as to compensate for the relative movement between the image and the film.

Embodiments of the invention will now be described by way of example only with reference to the accompanying diagrammatic drawings of which:

DESCRIPTION OF THE PREFERRED EMBODIMENTS

Figure 1:
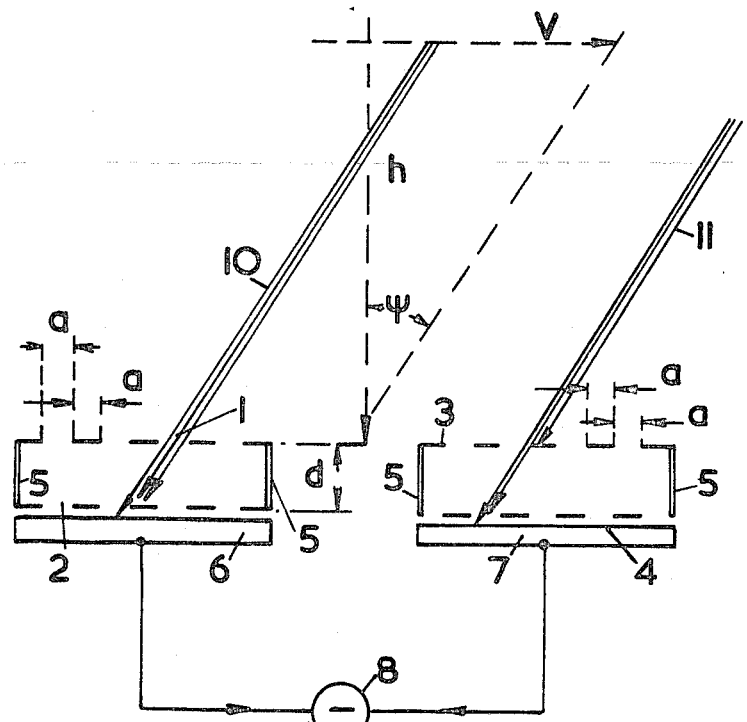
FIG. 1 is a diagrammatic sectional elevation view of apparatus for detecting and measuring relative motion of an object scene.

FIG. 1 shows two parallel mask patterns 1 and 2 spaced apart by a distance $d$. Two further parallel mask patterns 3 and 4 adjacent to and coplanar with the mask patterns 1 and 2 respectively are also spaced apart by a distance $d$. The gratings are shown in an end-on elevation view. The bars and spacings of the gratings have a width $a$.

The gratings as shown in the drawings are considerably enlarged to aid the explanation.

The periodicity of the alternately opaque and translucent bars of the mask pattern 1 is maintained in the mask pattern 3 which is mounted a distance $2na$ from the mask pattern 1, where n is an integer. The mask pattern 4 is also mounted a distance 2na from the mask pattern 1 but the bars of the mask pattern 4 are displaced laterally with respect to corresponding bars of the mask pattern 2 by a distance equal to the width a. The translucent bars of the mask pattern 4 thus appear directly behind the translucent bars of the mask pattern 3 when viewed from such a direction that the opaque bars of the mask pattern 2 appear to fill the translucent bars of the mask pattern 1. Opaque end pieces 5 are positioned at each of the ends of the pairs of mask patterns 1 and 2 and 3 and 4. A photo-sensitive element 6 is mounted directly behind the mask pattern 2 and a similar photo-sensitive element 7 is mounted directly behind the mask pattern 4. Electrical outputs from the elements 6 and 7 are connected to inputs of a differencing circuit 8. The output of the circuit 8 is connected to a frequency measuring circuit 9.

Any object, scene or landscape which may appear in front of the apparatus may be considered as an array of point sources of light (of different brightnesses and colors) and any relative motion between the apparatus and such an array will appear as an apparent motion of the point sources. To explain the operation of the apparatus, consider the effect of illumination from a typical point source at a very large distance $h$ from the mask patterns and moving transversely with velocity $V$. The instantaneous angle subtended by the point source to the optical axis of the mask patterns is shown by $\psi$. In the present embodiments the distance $h$ is considered to be very great compared to the mask pattern spacing $d$ so that light rays emanating from a point source are considered parallel.

The mode of operation of the embodiment of FIG. 1 will now be explained.

Light rays emanating from a typical distant object point will fall on the mask patterns 1 and 3 and cast a shadow of those mask patterns on the plane of the mask patterns 2 and 4 respectively behind them. When the object point is directly in front of the mask patterns approximately half of the rays falling on the grating 1 will be transmitted through the mask pattern 2. This light will excite the photo element 6. However none of the rays falling on the mask pattern 3 will be transmitted through the mask pattern 4 because the opaque bars of the mask pattern 4 are directly behind the translucent bars of the mask pattern 3. The photo element 7 therefore is not excited. As the object point moves across the plane of the mask patterns, the shadows will move across the mask patterns 2 and 4 causing the total light transmitted by each pair of mask patterns to be modulated in time. However as the amount of light transmitted by the pair of mask patterns 3 and 4 increases, that transmitted by the pair 1 and 2 decreases. The bundles of rays 10 and 11 illustrate this respective variation in the detected light. The outputs of the elements 6 and 7 are therefore in antiphase.

The outputs of the photo-sensitive elements are signals which have a frequency which depends on the velocity of the object point across the plane of the mask patterns, the distance $d$ between the mask patterns, the distance $h$ to the object point and the spacing of the bars on the mask patterns.

If an object scene is considered instead of an object point then the scene may be considered as being the sum of many object points each causing the development of a modulated signal as already described. Dark object points in the scene may be considered as producing signals in antiphase with the signals produced by similarly moving bright object points. The signal developed at the outputs of the photo-sensitive elements 6 and 7 will represent the cumulative effect of all the object points, but, while the effect of the dark points is to cancel the effect of the bright points, they are unlikely to be so evenly distributed as to reduce the resultant output signal to zero for any significant period of time.

Thus a moving scene will still produce modulated outputs at the elements 6 and 7 but the signal to noise ratio will not be as good as if a single point source was being viewed.

The differencing circuit 8 rejects common mode signals and produces an output signal of greatly improves signal to noise ratio. The frequency $f$ of the output of the circuit 8 is equal to $V/h \times d/2a$, where $V$ is the velocity of the object scene, $h$ is the object distance, $2a$ is the distance between alternate opaque or translucent bars of the mask patterns and $d$ is the mask pattern separation. The circuit 9 produces an output analogue voltage which is proportional to the frequency $f$ and which may be used as a control signal for a velocity servo controlling the speed of film through a camera in order to compensate for movement of the object scene while the camera shutter is open. The output signal may also be used directly to provide a measurement of relative scene velocity or it may be integrated with respect to time to provide an indication of the total apparent angular movement of the scene in a given interval.

It is sometimes required to provide measurements of object scene movement in two mutually orthogonal directions. The embodiment of FIG. 2 provides means for making such measurements.

Figure 2:
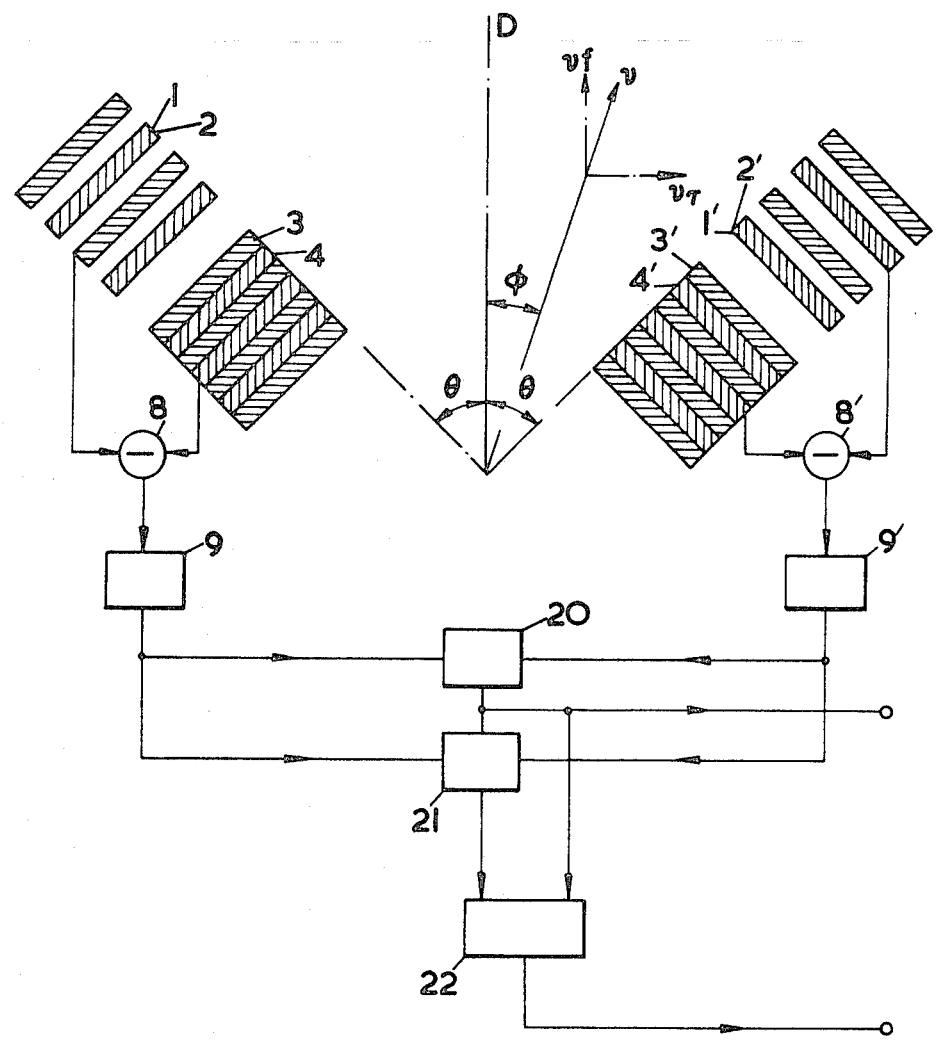
FIG. 2 is a diagrammatic illustration of apparatus which includes two sets of the apparatus of FIG. 1.

The apparatus of FIG. 2 includes two sets of the apparatus of FIG. 1 and like parts bear the same reference numerals. In FIG. 2 the mask patterns are shown in plan view, the bars of the mask patterns being mutually inclined at an angle $2\theta$. For the sake of clarity no attempt has been made to show the photo-sensitive elements 6 and 7 which lie behind the mask patterns in the drawing of FIG. 2.

The outputs of the frequency measuring circuits 9 and 9' are supplied to a signal summing circuit 20 and a signal differencing circuit 21. The outputs of the summing and difference circuits 20 and 21 are connected to a signal divider circuit 22.

The outputs of the circuits 9 and 9' are analogue voltages proportional to the components of scene movements which are orthogonal, respectively to the bars of the pairs of mask patterns 1, 2 and 3, 4 and 1', 2' and 3', 4'. The summing circuit 20 produces an analogue voltage output proportional to the sum of the orthogonal scene movement speeds while the circuit 21 produces an analogue voltage proportional to their difference. These sum and difference signal voltages are supplied to an analogue voltage divider circuit 22.

It will now be shown, with reference to the vector diagram on FIG. 2, that the sum voltage is proportional to image velocity in the direction of the bisector D of the angle between the directions of the bars of the gratings 1 to 4 and 1' to 4', the difference voltage is proportional to the apparent object velocity at ninety degrees to the bisector D and that the output of the analogue divider 22 is a simple function of the direction of the movement.

In FIG. 2, consider an object point moving at an angle $\phi$ to the bisecting line D with speed $V$. This movement will produce signals of frequencies $f_1$ and $f_2$ respectively at the outputs of the circuits 8 and 8' respectively, where $$f_1 = KV \cos(\phi + \theta) \quad (1)$$

$$f_2 = KV \cos(\theta - \phi) \quad (2)$$

where $K$ is a constant determined by the angle $\theta$ and the distance between bars of the mask patterns.

Hence $f_1 + f_2 = KV\, 2 \cos\phi \cos\theta$ and therefore $V = (f_1 + f_2/2)(1/K \cos\phi \cos\theta)$ Let the speed of the object point in the direction of bisector $D$ be $Vf = V\cos\phi$ and the speed of the object point at right angles to bisector $D$ be $Vr = V\sin\phi$.

Then $$Vf = \frac{f_1 + f_2}{2} \frac{1}{K \cos\phi \cos\theta} \cos\phi = K^1(f_1+f_2) \quad (3)$$

$$Vr = \frac{f_1+f_2}{2} \frac{1}{K \cos\theta} \frac{\sin\phi}{\cos\phi} = K^1 \tan\phi (f_1+f_2) \quad (4)$$

from (1) and (2), $$\frac{f_1}{f_2} = \frac{\cos\phi \cos\theta - \sin\phi \sin\theta}{\cos\phi \cos\theta + \sin\phi \sin\theta}$$

so that
$f_1 \cos\theta \cos\phi + f_1 \sin\phi \sin\theta = f_2 \cos\phi \cos\theta - f_2 \sin\theta \sin\phi$, and hence $(f_1 - f_2) \cos\theta \cos\phi + \sin\theta \sin\phi (f_1 + f_2) = 0$ It follows that $-\tan\theta \tan\phi = (f_1 - f_2/f_1 + f_2)$ and $$\tan\phi = \frac{-1}{\tan\theta} \frac{f_1 - f_2}{f_1 + f_2}$$

$$= K^{11} \frac{(f_2 - f_1)}{f_1 + f_2} \quad (5)$$

from (4) and (5)

$$V_r = K^1 \tan\phi (f_1 + f_2)$$

$$= K^1 K^{11} [(f_2 - f_1)/(f_1 + f_2)](f_1 + f_2)$$

$$V_r = K^{111} (f_2 - f_1)$$

We thus have $$V_f = K^1 (f_1 + f_2)$$

$$V_r = K^{111} (f_2 - f_1)$$

$$\tan\phi = K^{11} [(f_2 - f_1)/(f_1 + f_2)]$$

where $K^1$, $K^{11}$ and $K^{111}$ are constants fixed by the angle $\theta$ and the spacing of the bars of the mask patterns. The angle $\theta$ is preferably, but not necessarily, equal to 45°. For an aircraft installation the bisector $D$ is preferably aligned with the direction of flight.

Figure 4:
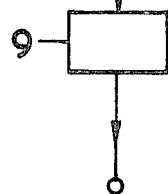
FIGS. 4 and 5 are plan views of parts of the structure of FIG. 3.
Figure 4:
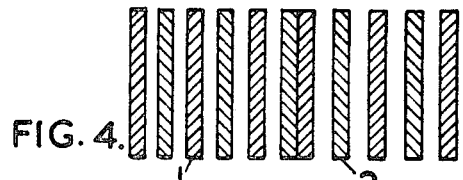
Figure 5:
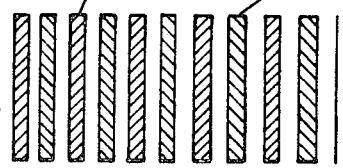
Figure 3:
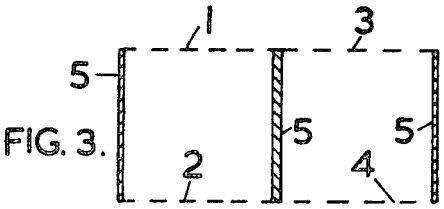
FIG. 3 is a sectional elevation of one practical arrangement of the mask pattern pairs of FIGS. 1 and 2, formed on a single integral structure.

It is convenient and preferable to provide the mask patterns 1 and 3 and 2 and 4 on single substrates or supports. It is also convenient to provide both pairs on a single assembly or integral support. For instance the mask patterns 1 and 3 may be formed on the front surface and the mask patterns 2 and 4 on the rear surface of a glass plate. FIGS. 3, 4 and 5 show possible arrangements. In those drawings parts which have a similar function to corresponding parts of FIGS. 1 and 2 are given the same reference numerals.

FIG. 3 shows a complete mask pattern unit made up of mask patterns 1 and 3 formed integrally on the same surface and also mask patterns 2 and 4 similarly formed. This unit is suitable for use in the apparatus of FIG. 1 or 2.

FIG. 4 shows in plan view the combined mask patterns 1 and 3 of FIG. 3 while FIG. 5 shows a plan view of the combined mask patterns 2 and 4.

In situations where the scene is to be observed or photographed through the intermediary of a television camera the outputs of an apparatus as hereinbefore described with reference to FIGS. 1 or 2 may be used to apply a compensating shift signal or shift signals to the camera time base deflection circuits.

The apparatus hereinbefore described produces signals which are ambiguous to the extent that signals derived from a forward movement in any direction will be identical to signals derived from a similar movement in the reverse direction (i.e. backwards). This ambiguity can be made immaterial in applications where in practice one component of the image motion will always predominate. For instance, in the case of optical or photographic apparatus mounted in an aircraft, the predominant component of the image motion will be due to the forward flight of the aircraft and will therefore be in a known direction. Apparatus of the kind exemplified by FIG. 2, should be installed in such applications so that the bisector $D$ coincides with the direction of flight. Variations in the attitude or flight of the aircraft will then generally cause only variations in the rates of the image movements observed, without reversing their direction, hence in these practical circumstances the possible ambiguity is unimportant.

I claim:

1. Apparatus for measuring the rate of displacement of the apparatus relative to radiation from an external environment, comprising:

a first pair of mask patterns and a second pair of mask patterns, each mask pattern being formed of parallel alternately opaque and translucent bars, the mask patterns being all held on the apparatus in a fixed relationship to each other so that the mask patterns are in parallel planes with their bars all parallel to each other and disposed so that parallel rays incident on the first pair of mask patterns at an angle such that said rays pass through the translucent bars of both patterns of the first pair of mask patterns with maximum transmission will be parallel to rays incident on the second pair of mask patterns at an angle such that they suffer maximum obstruction from the opaque bars of the second pair of mask patterns, a first radiation detector held on the apparatus so as to receive radiation which has passed through the translucent bars of both patterns of the first pair of mask patterns, a second radiation detector held on the apparatus so as to receive radiation which has passed through the translucent bars of both patterns of the second pair of mask patterns, a differencing circuit means having separate connections to said radiation detectors and responsive to the difference between the output signals of the said radiation detectors, and a frequency measuring circuit means connected to the differencing circuit means and responsive to the frequency of signals developed by the differencing circuit means.

2. An optical masking device as claimed in claim 1 wherein a mask pattern of the first pair of mask patterns is formed on the same support as a mask pattern of the second pair of mask patterns.

3. An optical masking device as claimed in claim 1 wherein the first pair of mask patterns and the second pair of mask patterns are formed on a single integral support.

4. Apparatus for measuring the rate of an apparent movement of an object point or scene in two mutually orthogonal directions, comprising a first set of apparatus of the kind claimed in claim 1 and a second set of apparatus of the kind claimed in claim 1, having the bars of their respective mask patterns in parallel planes but having the bars of the patterns of the first set of apparatus inclined at a predetermined angle to the bars of the patterns of the second set of apparatus, a summing circuit means connected to receive signals from the frequency measuring circuit means of both sets of apparatus, for producing a signal proportional to the sum of the frequencies of the signals applied to the said frequency measuring circuit means, and a differencing circuit means connected to receive signals from the frequency measuring circuit means of both sets of apparatus, for producing a signal proportional to the difference between the frequencies of the signals applied to the said frequency measuring circuit means.

* * * * *